United States Patent [19]

Gregg

[11] 4,100,305
[45] Jul. 11, 1978

[54] METHOD OF MAKING AN IMPROVED COFFEE VOLATILES CONCENTRATE

[75] Inventor: Richard Gregg, Greenhills, Ohio

[73] Assignee: The Procter & Gamble Company, Cincinnati, Ohio

[21] Appl. No.: 655,608

[22] Filed: Feb. 5, 1976

[51] Int. Cl.² ............................................. A23C 1/06
[52] U.S. Cl. .................................. 426/385; 426/386; 426/478
[58] Field of Search ............... 426/386, 387, 432, 434, 426/511, 385, 478

[56] References Cited

U.S. PATENT DOCUMENTS

| | | | |
|---|---|---|---|
| 2,680,687 | 6/1954 | Lemonnier | 426/386 |
| 3,035,922 | 5/1962 | Mook et al. | 426/387 |
| 3,132,947 | 5/1964 | Mahlmann | 426/386 |
| 3,244,532 | 4/1966 | Mahlmann | 426/511 X |
| 3,261,689 | 7/1966 | Ponzoni | 426/432 X |
| 3,532,507 | 10/1970 | Cascione | 426/385 |
| 3,655,399 | 4/1972 | Pitchon et al. | 426/434 X |
| 3,717,472 | 2/1973 | Strobel | 426/386 X |
| 3,765,904 | 10/1973 | de Roissart et al. | 426/386 X |

FOREIGN PATENT DOCUMENTS

| | | | |
|---|---|---|---|
| 563,792 | 7/1975 | Switzerland | 426/386 |
| 246,454 | 10/1926 | United Kingdom | 426/386 |

*Primary Examiner*—Frank Sever
*Attorney, Agent, or Firm*—Leonard Williamson

[57] ABSTRACT

A method of steam-stripping and recovering desirable volatiles from roast and ground coffee particles by subjecting them to conditions which preserve the freshness of the coffee volatiles, as well as, the freshness of the soluble solids remaining in the devolatilized coffee. A semi-bed of mechanically fluidized roast and ground coffee is sprayed with 32°–110° F (0°–43.3° C) water and contacted with steam for devolatilization under an absolute pressure of 5–100 mm of Hg and a temperature of 32°–110° F. The resulting volatiles-laden steam is then condensed under an absolute pressure of about 0–80 mm Hg and under supercooling conditions to provide a frost. A coffee volatiles-containing concentrate is prepared by contacting the frost with an aqueous coffee extract.

8 Claims, No Drawings

METHOD OF MAKING AN IMPROVED COFFEE VOLATILES CONCENTRATE

BACKGROUND OF THE INVENTION

This invention relates to a method or process for the preparation of a coffee product. More particularly, it relates to a process for steam-stripping desirable volatiles from roast and ground coffee and preparing a coffee concentrate containing those volatiles.

Many methods have been described for the production of coffee aromatic products. Illustrative of such methods are those described in U.S. Pat. Nos.: Strobel, 3,717,472, Feb. 1973; Cascione, 3,532,507, Oct. 1970; Mook et al., 3,035,922, May 1962; Mahlmann, 3,244,532, April 1966; Pitchon et al., 3,653,910, April 4, 1972; White et al., 3,615,665, Oct. 26, 1971.

The flavors and aromas of freshly brewed vacuum roast and ground coffee have tended to be the standard against which soluble or "instant" coffee products have been judged and efforts have, thus, been principally directed toward duplicating in soluble products those qualities of flavors and aromas of freshly brewed vacuum roast and ground coffee. Prior attempts for the most part have involved the add-back to coffee extracts of coffee volatiles separated from coffee by a variety of techniques. The separation and recovery of high quality coffee volatiles has not, however, been entirely successful. Processing inefficiencies and complexities causes undesirable flavor degradation of the coffee volatiles or devolatilized coffee, e.g., harshness or bitterness, have been especially evident.

It is an object of the present invention to provide a process for preparing a concentrate of coffee volatiles for use in a soluble coffee product to provide enhanced flavor and aroma qualities.

It is an object of the present invention to provide a high quality coffee volatiles concentrate.

It is another object of the present invention to provide an improved process for steam stripping coffee aromatics from roast and ground coffee.

These and other objects and advantages of the present invention will become apparent from the detailed description provided hereinafter.

SUMMARY OF THE INVENTION

The objects of the present invention are achieved by the employment of certain processing conditions more fully described hereinafter. It has been discovered that the combination of the present steam-stripping and coffee volatiles recovery operations will permit the production of a high quality coffee volatiles concentrate which, when blended with certain other coffee products, provides flavor and aroma enhancement.

In its essential aspects, the process of the present invention comprises: (a) uniformly wetting roast and ground coffee particles, preferably while they are in a state of fluidization, with from about 0.1-0.9 parts water per part of coffee; (b) contacting mechanically fluidized coffee particles with from about 0.005-0.05 parts steam to strip volatiles therefrom, the coffee particles being contacted with said steam under an absolute pressure of about 5-100 mm of mercury and for a period of about 0.1 to about 45 minutes, and at a temperature of 32°-110° F; (c) collecting volatiles-laden steam in the form of a frost by condensing at a temperature of from −100° F to −320° F (−73.33° to −195.56° C) and at an absolute pressure of about 0 to 80 mm of mercury; (d) melting the frost to form a coffee volatiles concentrate by contacting said frost with at least an equal weight of an aqueous coffee extract having from about 25%–65% solids.

DETAILED DESCRIPTION OF THE INVENTION

The process of this invention involves subjecting roast and ground coffee to a particular combination of processing steps for devolatilization and the preservation of those coffee volatiles. A principal step of the process of the invention is a steam-stripping or devolatilization step whereby roast and ground coffee is subjected to the effects of contact with steam under certain conditions described hereinafter. This operation is carried out at a temperature of from about 32° F (0° C) to about 110° F (43.33° C) and under absolute pressure of about 5 to about 100 mm of mercury so that the volatiles might be removal from the coffee particles without degrading the flavors and aromas in those volatiles or the flavors or taste of the soluble coffee solids remaining in the devolatilized coffee grounds.

One aspect of the steam-stripping operation is the uniform wetting of the roast and ground coffee particles, preferably while they are in a state of mechanical fluidization. About 0.1 to about 0.9 parts of water per part of roast and ground coffee is required to facilitate the release of the coffee volatiles at the moderate operating temperatures. The wetting water temperature range is from about 32° F to about 110° F. The maintenance of this temperature range is critical for the steam-stripping operation to achieve the quality of coffee flavors and aromas in the final coffee volatile concentrate. The steam-stripping operation may be continuous or a batch operation. The coffee particles are sprayed with water while being contacted with from about 0.005 to about 0.05 parts of steam per part of roast and ground coffee. In a continuous operation, the wetting or spraying and the contacting with steam are simultaneous and continuous operations.

The volatiles are released in the form of volatiles-laden steam. The steam contact time for the devolatilization operation is from about 0.1 to about 45 minutes, preferably from about 0.5 to about 10 minutes. Fluidization while steam-stripping, time, temperature and pressure as described herein, are critical and maximize the speedy recovery of fresh coffee volatiles by avoiding the less favorable conditions which have been found to degrade those volatiles as well as the flavors of the soluble coffee solids left in the devolatilized coffee grounds. The mechanical fluidization of the coffee particles during the steam-stripping step is very important in the practice of the present invention. It provides uniform steam-stripping by allowing intimate contact between the steam and the coffee particles. Moreover, it allows the steam-stripping operation to be conducted at lower temperatures and pressures without increasing the pressure drop across the coffee bed. As used herein, the term semi-bed of coffee denotes a state of partial fluidization of coffee whereby some of the coffee particles are momentarily on the bottom of the coffee bed while the other particles are mechanically fluidized.

The grind size of the roast and ground coffee subjected to devolatilization can vary widely. While high quality volatiles can be recovered from roast and ground coffee of varying grind sizes, the nature of the grind size and the particular method employed for the extraction of the devolatilized coffee will affect the yield of coffee solubles recoverable from the devolatilized coffee. Where the devolatilized coffee is desirably extracted by a slurry extraction process, the roast and ground coffee subjected to the devolatilization step will desirably be finely ground. A fine grind of from about 5 to about 800 microns is preferred. This grind is conveniently obtained by embrittlement of roasted coffee beans with liquid nitrogen or Dry Ice and grinding of the cold embrittled beans in a coffee grinder. A grinder suitable for this operation is the Fitz ® Mill Model U Granulator, manufactured by the Fitzpatrick Co., Elmhurst, Ill. 60126. It will be noted that ultra-fine grinding of coffee is accomplished in this fashion without reaching temperatures that tend to degrade or drive off essential oils and coffee volatiles; thus, this grinding method preserves the quality of the final coffee product. Preferably, the roast and ground coffee is ground at a temperature of about −110° F to about −320° F.

The volatiles-laden steam which is generated by the devolatilization or steam-stripping step is drawn from the vessel or chamber in which the operation is performed and collected in a condenser in the form of frost. The condenser must be maintained at a temperature of from about −100° F (−73.33° C) to about −320° F (195.56° C) and at an absolute pressure of from about 0 to 80 mm of mercury. Again, these temperatures and pressures are critical to achieve the desired quality of flavors and aromas in the final coffee volatiles concentrate. It has been found that condensation of the volatiles-laden steam at higher temperatures and pressures results in unsatisfactory products.

The collection of frost is followed by a melting step to provide a coffee volatiles concentrate. This is conducted by contacting the frost with an aqueous coffee extract of at least an equal amount by weight of said frost and having a solids content of from about 25% to about 65% soluble solids. The weight ratio of said aqueous coffee extract to said frost is preferably from about 1:1 to about 10:1, but larger amounts of extract can be used. The percentage of soluble solids in said aqueous coffee extract is preferably 27% to 50%. The aqueous coffee extract is preferably one made by a slurry extraction operation described herein, but other coffee extracts may be used for melting and preserving maximum volatile freshness. It is, however, critical that the melting of the frost is achieved in this fashion for it has been found that if the frost is allowed to melt by itself at room temperature or below, an unsatisfactory product results.

The coffee volatiles coffee concentrate resulting from the melt can be further concentrated and dried, preferably, freeze-concentrated and freeze-dried. Alternatively, the coffee volatiles concentrate can be mixed with coffee extract and then freeze-concentrated or evaporation-concentrated and then freeze-dried or spray-dried.

The soluble coffee solids remaining in the devolatilized coffee may be extracted by resort to known extraction methods. It has been found that the flavors or taste of those soluble coffee solids are still fresh although the volatiles have been removed by the steam-stripping operation of the present invention.

The process of this invention will be further understood by reference to the following examples.

EXAMPLE I

Six hundred pounds of a blend of green coffee beans were roasted in a Thermolo Roaster ® for 17.3 minutes at a maximum temperature of 420° F (215.56° C). The roasted coffee had a photovolt color of 72. The roaster was first preheated to 400° F (204.44° C) and the beans added thereto.

About 500 pounds (226.8 kg) of this roasted coffee were cooled to embrittlement with liquid nitrogen and cold fine ground at a temperature of about −310° F (−190° C) with a hammermill grinder to a particle size ranging from about 10 to about 75 microns. The grinder used in this operation was a Fitz ® Mill Model U Granulator/Comminutor, manufactured by the Fitzpatrick Co., Elmhurst, Ill. 60126 and described in its Bulletin No. 202. A 33 mil screen and DS-674 blades were used, both of which are Fitz Mill products. The ground coffee was held overnight in a cold room at −40° F (−40° C).

DEVOLATILIZATION STEP

The next day, these roast and ground coffee particles were fed into a mechanically fluidized bed (provided by a 10.3 cubic foot (0.29 cubic meter) continuous Littleford Mixer, Model KM 300D, manufactured by the Littleford Bros. Inc., Cincinnati, Ohio) at a flow rate of about 80 pounds (36.3 kg) per hour.

Plow-shaped mixing tools rotating at high speeds inside the horizontal mixing shell imparted rapid but gentle motion to the coffee particles, turning them into a turbulent fluidized state. The plows were designed to lift the materials from the drum walls so that rapid mixing takes place without adverse effect on the fragile coffee particles.

The fluidized coffee particles were uniformly wet with about 0.132 parts water per part of the coffee. The temperature of the water was about 65° F (18.33° C). The water was dispersed into the mixing chamber (drum) of the mixer by spraying water on choppers to obtain uniform wetting. Independently driven rotating choppers arranged between the paths of the plows atomized the water as well as broke up agglomerates or lumps which existed in the coffee bed that may have formed during the operation. The water was sprayed on the coffee particles in the mixing chamber at a flow rate of about 10.5 pounds (4.76 kg) per hour.

A stream of cool steam was introduced into the chamber counter-current to the flow of the wet fluidized coffee particles, at a flow rate of about 2.3 pounds (1.04 kg) per hour. When the steam entered the vacuum chamber its temperature fell to about 71° F (22° C). Inside the mixing chamber was held under an absolute presssure of about 27 mm of mercury. The fluidized bed temperature was about 71° F. These conditions were maintained throughout the operation with little variation. The steam made intimate contact with the coffee particles for about 1.2 minutes and thereby stripped them of their volatiles. The products of this operation are called herein volatiles-laden steam and devolatilized coffee.

The volatiles-laden steam passed out of the mixing chamber through a gravity solids separator to remove any carryover of roast and ground coffee particles, and then collected and condensed on the walls of a four-liter glass vacuum flask in the form of a frost. The vacuum flask was held under an absolute pressure of about 15 mm of mercury and at a temperature of about −320° F with a liquid nitrogen jacket and a vacuum pump.

About 3.5 pounds (1.59 kg) of the volatiles-laden frost were recovered and a coffee volatile concentrate was made therefrom. The frost was melted by contacting it with about 31.6 pounds (14.33 kg) of a 30% solids, aqueous coffee extract.

In order to recover fresh soluble coffee solids from the devolatilized coffee grounds, a slurry extraction process was used, which process is more fully described in the co-pending patent application of J. A. Weikel, R. Gregg and J. M. Patel, Ser. No. 655,606, filed of even date, herein incorporated by reference in its entirety.

The coffee volatile concentrate of Example I was vacuum freeze-dried. The finer granules were separated from the larger ones using a 32 mesh screen and the finer granules recycled. The yield was 6.6 pounds (2.99 kg) of a substantially dry and granular volatiles-laden coffee concentrate, some of which was later mixed with a dry soluble coffee extract at an addback level of 19.2% to provide a final improved instant coffee product.

EXAMPLE II

Another coffee volatile concentrate was obtained by the procedure set out in Example I except that "regular" grind size coffee was used instead of the ultra-fine grind.

The resulting concentrate of this Example was comparable in aroma, flavor and taste to the coffee volatile concentrate of Example I.

What is claimed is:

1. A method for preparing a coffee volatiles concentrate from roast and ground coffee comprising the steps of:
   (a) uniformly wetting a roast and ground coffee with from about 0.1 to about 0.9 parts water per part of roast and ground coffee, said water being at a temperature of from about 32° F to about 110° F while said coffee is in a turbulent state of fluidization;
   (b) contacting said roast and ground coffee, while maintaining the coffee in a state of fluidization, with from about 0.005 to about 0.05 parts of cool steam, per part of roast and ground coffee, thereby to provide volatiles-laden steam and devolatilized roast and ground coffee, said contact being conducted under an absolute pressure of from about 5 to about 100 mm of mercury, the steam having a temperature of from about 32° F to about 110° F, said roast and ground coffee making contact with said steam for about 0.1 to about 45 minutes;
   (c) collecting the volatiles-laden steam as a frost by condensation at a temperature of from about −100° F to about −320° F and at an absolute pressure of from about 0 to about 80 mm of mercury;
   (d) melting the frost to form a coffee volatiles concentrate by contacting the frost with at least an equal weight of an aqueous coffee extract having a solids content of from about 25% to about 65%; and wherein said fluidization is mechanically induced under high vacuum within a horizontal mixing shell, by mixing tools which rotate within said shell at high speeds sufficient to impart rapid but gentle motion to the fragile particles of said roast and ground coffee; said mixing tools being so designed such as to lift said fragile particles from the walls of said shell, so that rapid mixing occurs without substantial adverse effect to said fragile particles.

2. The method of claim 1 wherein said roast and ground coffee was ground at a temperature of about −110° F to about −320° F.

3. The method of claim 1 wherein said volatiles are recovered by melting said frost by introducing a 27% to about 50% solids aqueous coffee extract wherein the weight ratio of this extract to said frost is from about 1:1 to about 10:1.

4. The method of claim 1 wherein said method is a continuous process.

5. The method of claim 4 wherein said roast and ground coffee has an average particle size of from about 5 to about 800 microns.

6. The method of claim 4 wherein said roast and ground coffee is in contact with said steam for about 0.5 to about 15 minutes.

7. The method of claim 1 wherein said coffee volatiles concentrate is freeze-dried.

8. The method of claim 1 wherein said uniform and mechanically fluidized wetting is conducted on a continuous supply of said roast and ground coffee.

* * * * *